(12) United States Patent
Kim et al.

(10) Patent No.: US 8,261,687 B2
(45) Date of Patent: Sep. 11, 2012

(54) CATALYST-SPREADING DEVICE THAT UNIFORMLY SPREADS CATALYST ON A SUBSTRATE IN A DEVICE FOR PRODUCING CARBON NANOTUBES

(75) Inventors: Sung-Soo Kim, Chungcheongbuk-do (KR); Ho-Soo Hwang, Suwon-si (KR)

(73) Assignee: Korea Kumho Petrochemical Co., Ltd, Seoul (KR)

( * ) Notice: Subject to any disclaimer, the term of this patent is extended or adjusted under 35 U.S.C. 154(b) by 726 days.

(21) Appl. No.: 12/045,404

(22) Filed: Mar. 10, 2008

(65) Prior Publication Data
US 2009/0053120 A1 Feb. 26, 2009

(30) Foreign Application Priority Data
Aug. 21, 2007 (KR) .................. 10-2007-0084055

(51) Int. Cl.
*B05B 7/00* (2006.01)
*B65G 37/00* (2006.01)
*B07B 1/38* (2006.01)
(52) U.S. Cl. ........... 118/309; 198/364; 51/164; 209/332
(58) Field of Classification Search .................. 118/308, 118/309; 222/196; 209/21, 365, 367, 696, 209/342, 391
See application file for complete search history.

(56) References Cited

U.S. PATENT DOCUMENTS

| | | | | |
|---|---|---|---|---|
| 3,378,142 A | * | 4/1968 | Wehner | 209/325 |
| 3,648,649 A | * | 3/1972 | Wasserman | 118/31 |
| 3,662,923 A | * | 5/1972 | Spanton et al. | 222/55 |
| 3,784,061 A | * | 1/1974 | Hogan | 222/200 |
| 3,834,534 A | * | 9/1974 | Peterson et al. | 209/326 |
| 3,861,086 A | * | 1/1975 | Dreher | 451/328 |
| 3,900,602 A | * | 8/1975 | Rummel | 427/115 |
| 3,917,050 A | * | 11/1975 | Gregor | 198/358 |
| 4,000,061 A | * | 12/1976 | Bowling et al. | 209/21 |
| 4,062,768 A | * | 12/1977 | Elliot | 209/341 |
| 4,287,056 A | * | 9/1981 | Dumbaugh et al. | 209/332 |
| 4,426,752 A | * | 1/1984 | Nakayama | 16/82 |
| 4,598,662 A | * | 7/1986 | Chen | 118/34 |
| 4,684,041 A | * | 8/1987 | Jones et al. | 222/161 |

(Continued)

FOREIGN PATENT DOCUMENTS
JP 63228570 A 9/1988

OTHER PUBLICATIONS

Office Action from the Chinese Patent Office issued Jul. 14, 2010 for the corresponding Chinese patent application No. 200810098203.3.

*Primary Examiner* — Dah-Wei Yuan
*Assistant Examiner* — Karl Kurple
(74) *Attorney, Agent, or Firm* — Kilpatrick Townsend & Stockton LLP

(57) ABSTRACT

According to an exemplary embodiment of the present invention there is provided a catalyst-spreading device comprising: a mesh boat which stores catalyst to be spread on a substrate and includes a bottom having a mesh net, a transportation unit which transports the mesh boat or the substrate, and a vibration unit which vibrates the mesh boat to spread the catalyst on the substrate.

3 Claims, 4 Drawing Sheets

U.S. PATENT DOCUMENTS

| | | | | |
|---|---|---|---|---|
| 4,737,269 A | * | 4/1988 | Bischoff | 209/23 |
| 4,763,770 A | * | 8/1988 | Zagorzycki et al. | 198/364 |
| 5,078,090 A | * | 1/1992 | Richman | 118/702 |
| 5,625,015 A | * | 4/1997 | Brinen et al. | 526/160 |
| 5,769,281 A | * | 6/1998 | Bates | 222/196 |
| 5,945,154 A | * | 8/1999 | Thomas | 427/11 |
| 6,074,704 A | * | 6/2000 | Le Riche et al. | 427/207.1 |
| 6,125,902 A | * | 10/2000 | Guddal | 156/390 |
| 6,197,114 B1 | * | 3/2001 | Rodenberger | 118/623 |
| 6,679,385 B2 | * | 1/2004 | Suter et al. | 209/367 |
| 6,953,122 B2 | * | 10/2005 | Allaei | 209/365.1 |
| 2002/0153288 A1 | * | 10/2002 | Suter et al. | 209/365.4 |
| 2004/0020945 A1 | * | 2/2004 | Aumuller et al. | 222/196 |
| 2005/0158463 A1 | * | 7/2005 | Browning et al. | 427/180 |
| 2009/0206011 A1 | * | 8/2009 | Cudahy | 209/365.3 |

* cited by examiner

CATALYST-SPREADING DEVICE THAT UNIFORMLY SPREADS CATALYST ON A SUBSTRATE IN A DEVICE FOR PRODUCING CARBON NANOTUBES

CROSS-REFERENCE TO RELATED APPLICATION

This application claims priority from Korean Patent Application No. 10-2007-0084055 filed on Aug. 21, 2007, in the Korean Intellectual Property Office, the disclosure of which is incorporated herein by reference in its entirety.

BACKGROUND OF THE INVENTION

1. Field of the Invention

The present invention relates to a catalyst-spreading device. More particularly, the present invention relates to a catalyst-spreading device that uniformly spreads catalyst on a substrate in a device for producing carbon nanotubes.

2. Description of the Related Art

A carbon nano-tube is formed in a shape of hexagon honeycomb by having a carbon atom bonded with three surrounding carbon atoms. Since a carbon nano-tube has superior electrical, thermal, and mechanical characteristics compared to conventional devices, it can be applied to various industrial fields including electric field-emission devices, electrochemistry, energy storages, ultra fine mechatronics systems, and organic or inorganic compound materials.

Methods to produce carbon nanotubes include a laser ablation method which produces carbon nanotubes by evaporating a test sample made of mixture of metal and graphite powder using a laser, an arc discharge method that generates arc discharge by applying voltages to two carbon pillars having different diameters and produces carbon nanotubes, a chemical vapor deposition (CVD) method that induces carbon nanotube growth by heat or plasma by injecting a source gas into a reactor, and a pyrolysis of hydrocarbon that produces carbon nanotubes in a gas phase by decomposing hydrocarbon by supplying a reaction tube heated with transition metal with liquid or gas hydrocarbon.

Specially, when carbon nanotubes are produced using the chemical vapor deposition that induces carbon nanotube growth using a catalyst, it is important for the catalyst to be uniformly spread on a substrate.

A catalyst is a material that can control a reaction rate, and when producing carbon nanotubes it is not trivial to spread powder catalyst on a substrate uniformly. For example, scattering powder catalyst on a substrate or manually spreading powder catalyst on a substrate does not guarantee uniform distribution and can decrease the yield of carbon nanotube production.

Therefore, in order to uniformly spread catalyst on a substrate an automated device that provides the substrate with catalyst. Also, for mass production of carbon nanotubes a catalyst-spreading device that can uniformly spread catalyst is required.

SUMMARY OF THE INVENTION

The present invention was devised by taking the problems stated above in consideration, and provides a device that uniformly spreads catalyst on a substrate in a device for producing carbon nanotubes.

Also, the present invention provides an instrument that automates the catalyst spreading on a substrate and a catalyst-spreading device that can control the area of catalyst spreading on the edge of a substrate.

The present invention should not be construed as being limited to the above object, and the above stated objects as well as other objects, features and advantages of the present invention will become clear to those skilled in the art upon review of the following description.

According to an aspect of the present invention, there is provided a catalyst-spreading device, the device including a mesh boat which stores catalyst to be spread on a substrate and includes a bottom having a mesh net, a transportation unit which transports the mesh boat or the substrate, and a vibration unit which vibrates the mesh boat to spread the catalyst on the substrate.

BRIEF DESCRIPTION OF THE DRAWINGS

The above and other features and advantages of the present invention will become apparent by describing in detail exemplary embodiments thereof with reference to the attached drawings in which.

DETAILED DESCRIPTION OF THE INVENTION

Figure 1:
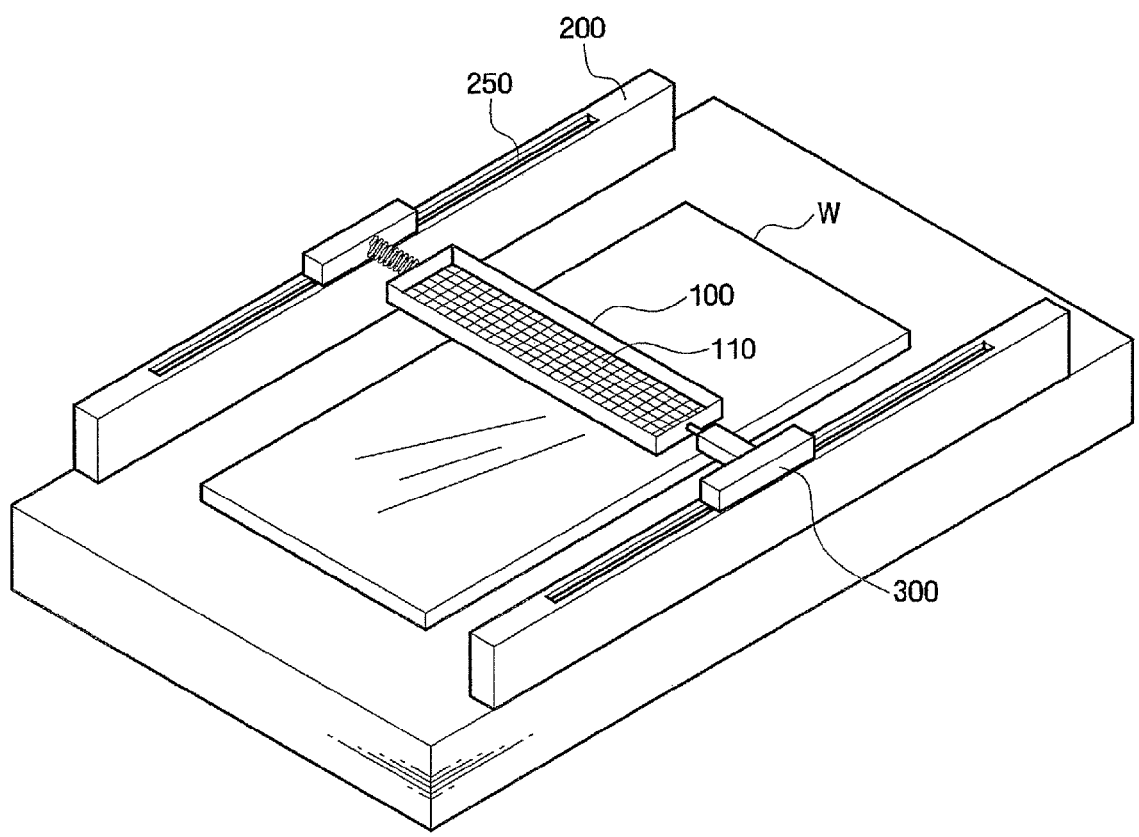
FIG. 1 is a perspective view illustrating a catalyst-spreading device according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, embodiments of the present invention will be described in detail with reference to the attached drawings.

Figure 2:
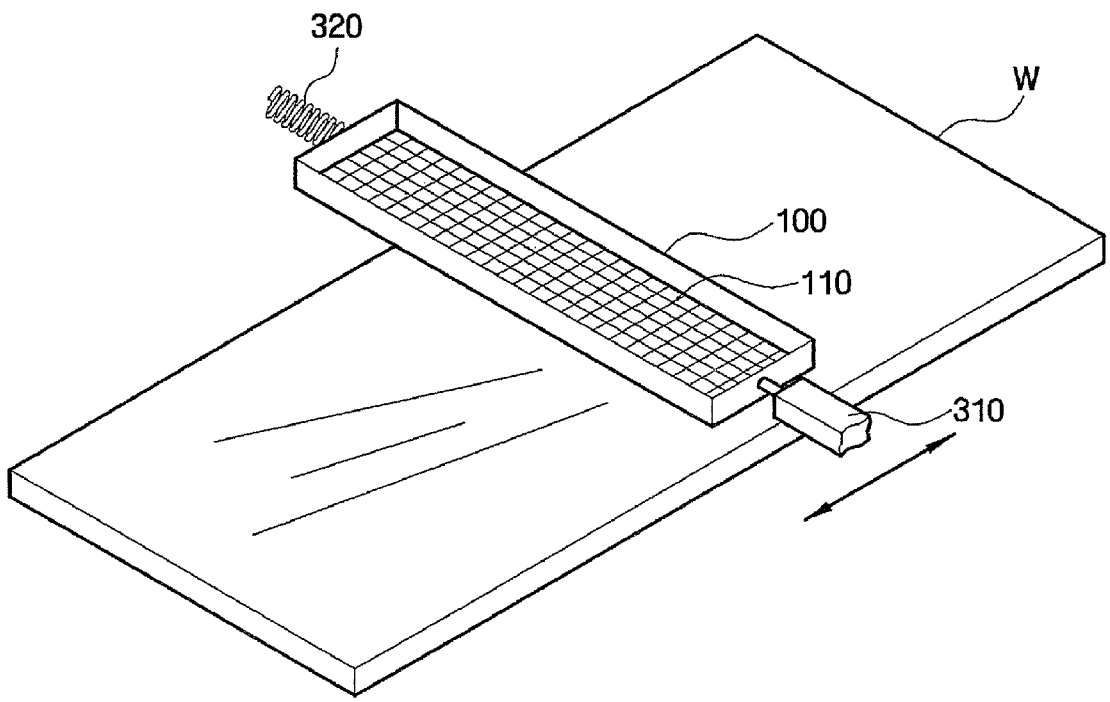
FIG. 2 is a perspective view illustrating a vibration unit and a mesh boat in a catalyst-spreading device according to an exemplary embodiment of the present invention.

FIG. 1 is a sectional view illustrating a catalyst-spreading device according to an exemplary embodiment of the present invention. FIG. 2 is a sectional view illustrating a catalyst-spreading device including a vibration unit and a mesh boat according to an exemplary embodiment of the present invention;

Referring to FIGS. 1 and 2, a catalyst-spreading device according to an exemplary embodiment of the present invention can include a mesh boat 100, a transportation unit 200, and a vibration unit 300.

The mesh boat 100 scatters catalyst on a substrate W. The mesh boat 100 stores the catalyst and temporarily scatters the catalyst on the substrate W through the movement by vibration. The mesh boat 100 can be made such that the length of the mesh boat 100 is the same as the width of the substrate W and spread the catalyst on the width of the substrate W by the vibration of the mesh boat 100.

The mesh boat 100 includes no roof, sealed sides, and a bottom having multiple mesh nets 110. The mesh net 110 is composed of multiple holes or multiple meshes having rectangular or triangular empty space. Thus, the powder-type catalyst is spread over a substrate through the meshes or holes located on the bottom of the mesh boat 100, and the size of the meshes or holes can be varied.

In addition, the bottom can be constructed to have multiple layers. For example, in the case where the bottom is constructed to have three boards, the mesh size of each board can be adjusted. The top board can be made to have the largest mesh size and the bottom board can be made to have the smallest mesh size. This can avoid a catalyst being lumped, and the catalyst can be uniformly spread through the mesh boat 100.

The vibration unit 300 makes the mesh boat 100 vibrate. As shown in FIG. 2, the vibration unit 300 can include a vibration generator 310 and a spring 320 which are attached to both sides of the mesh boat 100. The vibration unit 300 makes the mesh boat 100 vibrate and causes different movements for the catalyst on the mesh boat 100 and the mesh boat. As a result, the catalyst drops from the mesh boat 100.

The vibration generator 310 vibrates the mesh boat 100. The vibration generator can provide the mesh boat 100 with initial movement, and the moving mesh boat 100 with an extra amount of movement. The vibration generator 310 not only vibrates the mesh boat 100 but also acts as a damper against the movement of the mesh boat 100 by having oil in the vibration generator 310.

The spring 320 is attached to one or both sides of the mesh boat 100, and provides elasticity to movement of the mesh boat 100. In theory, the spring maintains the vibration of the mesh boat 100. However, in practice the vibration of the mesh boat 100 is diminished by surrounding components which act as a damper.

The vibration unit 300 can control the number of vibrations and the strength of vibration of the mesh boat 100 by taking the width of the catalyst spread on the substrate and the time period of the spread into consideration. The number of vibrations and the strength of vibration of the mesh boat 100 can be also determined by experimental or theoretical calculations.

The transportation unit 200 can transport the substrate or the mesh boat 100 to spread catalyst on the entire substrate. For example, in the case of transporting the substrate if the mesh boat 100 is vibrating at a certain position, the substrate can perform a reciprocating motion in one direction on the mesh boat 100 basis. Here, the mesh boat 100 spreads catalyst, and the transportation unit 200 transports the substrate to have catalyst spread on its surface. In contrary, in the case where the substrate is set to be motionless, the vibrating mesh boat 100 can spread the catalyst by scanning the substrate with reciprocating motion. Here, the substrate is motionless, and the mesh boat spreads the catalyst on the entire substrate.

The transportation unit 200 transports the substrate or the mesh boat 100, and the substrate and the mesh boat 100 can move along a slide 250 or rail. A motor (not shown) or an oil-pressured piston (not shown) can be used to drive the movement. For accurate position control a chain can be used. Also, an additional position sensor can be included.

Figure 3:
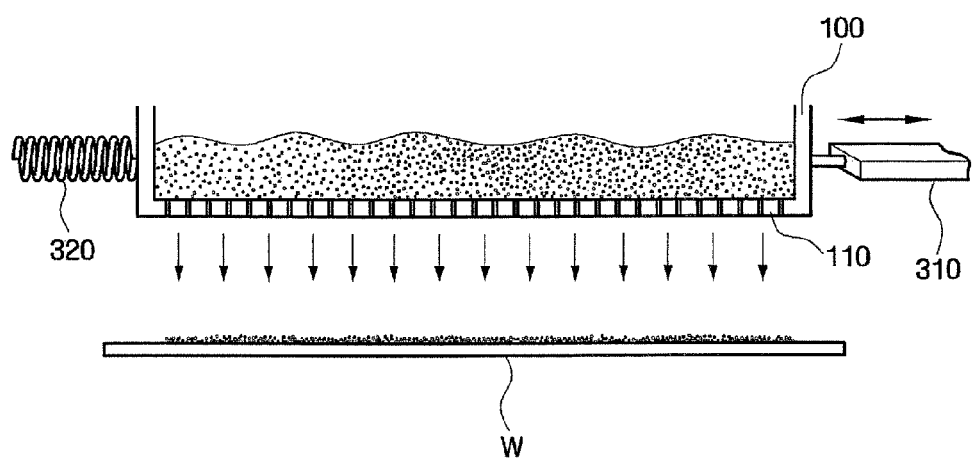
FIG. 3 is a drawing illustrating an operation of a catalyst-spreading device according to the exemplary embodiment of the present invention.

The operations of a catalyst-spreading device which is composed as described above according to the exemplary embodiment of the present invention are described below. FIG. 3 is a drawing illustrating an operation of a catalyst-spreading device according to the exemplary embodiment of the present invention.

Referring to FIG. 3, the mesh boat 100 is located on the substrate W. The bottom of the mesh boat 100 is composed of the mesh net 110 and spreads the catalyst stored inside the mesh boat 100 through the mesh net 110. The mesh boat 100 is vibrated by the vibration generator 310 of the vibration unit 300, and the vibration of the mesh boat 100 is maintained by the spring 320 of the vibration unit 300. For example, when the mesh boat 100 is vibrated right and left, as illustrated in FIG. 3, catalyst can be spread on the substrate. If the length of the mesh boat 100 is same as the width of the substrate, one scattering with vibrations can spread catalyst over the entire width of the substrate.

As described above, by scattering catalyst using vibration, catalyst can be spread on the substrate, and catalyst can be spread over another area of the substrate by vibrating the substrate. Also, without moving the substrate, catalyst can be spread by moving the mesh boat 100 from one end to the other end on the substrate. In the case where spreading catalyst is not completed by one movement from one end to the other end, catalyst can be uniformly spread by moving the mesh boat 100 multiple times from one end to the other end on the substrate.

By vibrating the mesh boat 100 described above, catalyst can be uniformly spread on the substrate. When catalyst is scattered by the vibration of the mesh boat 100, a relatively uniform spread can be performed compared to scattering manually or scattering using a boat without vibration.

Also, storing catalyst inside the mesh boat 100 allows spreading catalyst on the entire area of the substrate with vibration of the mesh boat 100. As a result, spreading catalyst on the substrate can be automated.

Figure 4:
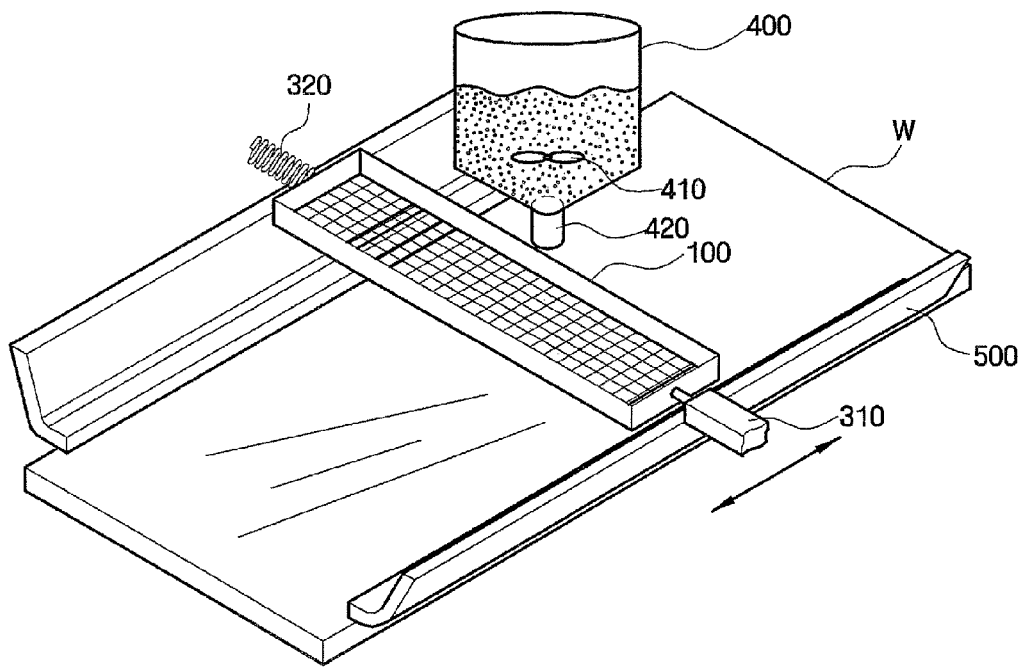
FIG. 4 is a perspective view illustrating a catalyst-spreading device according to another exemplary embodiment of the present invention.

FIG. 4 is a perspective view illustrating a catalyst-spreading device according to another exemplary embodiment of the present invention.

Referring to FIG. 4, a catalyst-spreading device according to another exemplary embodiment of the present invention can include a mesh boat 100, a transportation unit 200, a vibration unit 300, a catalyst injector 400, and a shield 500. Since previous sections described the mesh boat 100, the transportation unit 200, and the vibration unit 300, only the catalyst injector 400 and the shield 500 are described here.

The catalyst injector 400 stores powder catalyst and injects catalyst into the mesh boat 100. The catalyst injector 400 includes a pinwheel 410 to mix catalyst and the pinwheel 410 can mix catalyst stored in the catalyst injector 400. The catalyst injector 400 can include an inlet 420 to inject catalyst into the mesh boat 100. The inlet 420 is typically closed, and a fixed quantity injector (not shown) can be included to supply the mesh boat 100 with a fixed quantity. The fixed quantity injector can control the amount of catalyst supplied to the mesh boat by injecting a fixed amount of catalyst at a time.

The shield 500 acts as a barrier to prevent catalyst scattered by the mesh boat from going outside the edge of the substrate. The shield 500 is formed along with the edge of the substrate, and the shape of the shield 500 can be an aslant curve in a vertical view. Thus, although catalyst is landed on the shield 500, the catalyst is slided along with the inside of the shield 500 and spread on the substrate.

By adjusting the position of the shield 500, the spreading area on the substrate can be controlled. Specially, by positioning the shield 500 at the edge of the substrate, catalyst can be spread on the entire area except the edge of the substrate.

Figure 5:
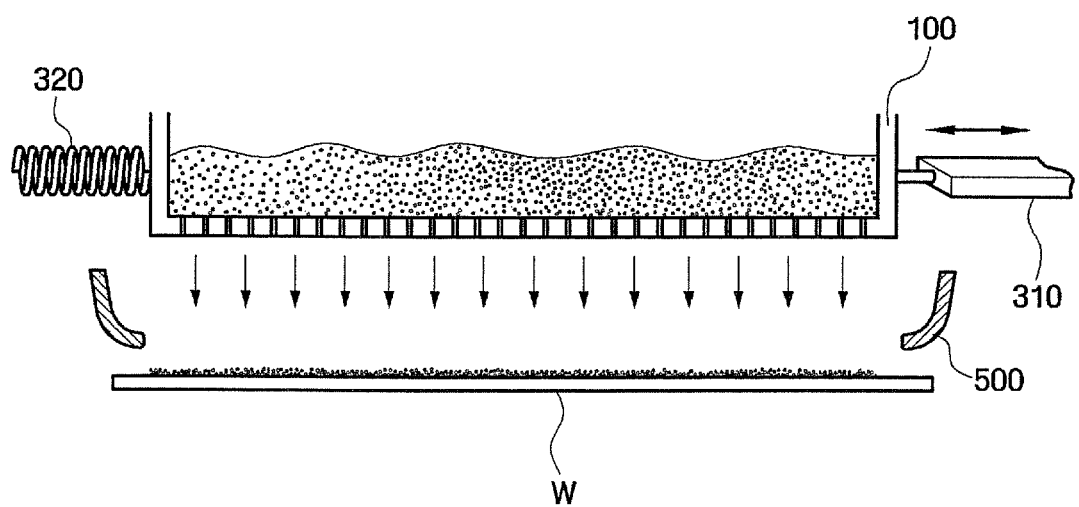
FIG. 5 is a perspective view illustrating an operation of a catalyst-spreading device according to another exemplary embodiment of the present invention.

The operations of the catalyst-spreading device which is composed as described above according to another exemplary embodiment of the present invention are described below. FIG. 5 illustrates operations of the catalyst-spreading device according to another exemplary embodiment of the present invention.

Compared to FIG. 3, FIG. 5 includes the shield 500. Thus, the catalyst-spreading operations of the catalyst-spreading device shown in FIG. 5 are essentially identical to those of the catalyst-spreading device shown in FIG. 3. However, the shield 500 guards the catalyst to prevent catalyst dropped from the mesh boat 100 from scattering outside of the substrate. Since the mesh boat 100 can move left and right due to the vibrations and cause catalyst scattered left and right, having a shield 500 can lead the catalyst scattered left and right to the area of the substrate.

Also, the spreading space at the edge of the substrate can be controlled by the shield 500. Thus, an extra area at the edge where catalyst is not spread can be secured, and catalyst spreading space can be controlled.

As described above, the spread area of the substrate can be adjusted by the shield 500, and catalyst scattered outside the substrate can be avoided to prevent waste of catalyst.

According to an exemplary embodiment of the present invention described above, catalyst can be uniformly spread on the substrate to produce carbon nanotubes. Also, by automating catalyst spread on the substrate, operation efficiency and convenience can be improved, and the area of catalyst spread at the edge of the substrate can be controlled.

Although the present invention has been described in connection with the exemplary embodiments of the present invention with reference to the accompanying drawings, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A catalyst-spreading device comprising:
    a mesh boat which stores catalyst to be spread on a substrate and includes sealed sides and a bottom having a mesh net;
    a transportation unit which transports the mesh boat on rails; and
    a vibration unit which vibrates the mesh boat to spread the catalyst on the substrate,
        wherein the vibration unit includes:
            a vibration generator that is connected to one end of the length direction of the mesh boat, and generates vibrations, and
                wherein the vibration generator comprises oil that acts as a damper against mesh boat movement;
            a spring that is connected to the other end, in the length direction, of the mesh boat and maintains the vibrations of the mesh boat and wherein the spring is disposed between the mesh boat and the transportation unit,
    a catalyst injector that injects catalyst in the mesh boat to be spread on the substrate; and
    a shield which prevents catalyst dropped from the mesh boat from going outside the substrate;
    wherein the vibration direction of the mesh boat is perpendicular to the transportation direction of the mesh boat.

2. The catalyst-spreading device of claim 1, wherein the length of the mesh boat is the same as the width of the substrate.

3. The catalyst-spreading device of claim 1, wherein the transportation unit repeatedly creates reciprocating motion of the mesh boat.

* * * * *